US011739799B2

(12) United States Patent
Bergfeld (10) Patent No.: US 11,739,799 B2
(45) Date of Patent: Aug. 29, 2023

(54) CONE FRICTION CLUTCH HAVING AN ACTUATOR AND A LEVER FOR DISENGAGING THE CLUTCH (71) Applicant: KENDRION (VILLINGEN) GMBH, Villingen-Schwenningen (DE)

(72) Inventor: Björn Bergfeld, Balingen-Endingen (DE)

(73) Assignee: KENDRION (VILLINGEN) GMBH, Villingen-Schwenningen (DE)

( * ) Notice: Subject to any disclaimer, the term of this patent is extended or adjusted under 35 U.S.C. 154(b) by 0 days.

(21) Appl. No.: 17/774,062

(22) PCT Filed: Sep. 8, 2020

(86) PCT No.: PCT/EP2020/075111
§ 371 (c)(1),
(2) Date: May 3, 2022

(87) PCT Pub. No.: WO2021/089218
PCT Pub. Date: May 14, 2021

(65) Prior Publication Data
US 2022/0341470 A1 Oct. 27, 2022

(30) Foreign Application Priority Data
Nov. 4, 2019 (DE) .......................... 102019129614.5

(51) Int. Cl.
*F16D 13/30* (2006.01)
*F16D 13/66* (2006.01)
(Continued)

(52) U.S. Cl.
CPC ............. *F16D 13/30* (2013.01); *F16D 13/66* (2013.01); *F16D 23/12* (2013.01); *F16D 25/082* (2013.01); *F16D 2023/126* (2013.01)

(58) Field of Classification Search
CPC .......... F16D 13/30; F16D 13/66; F16D 13/32; F16D 13/36; F16D 23/12; F16D 2023/126; F16D 25/082
See application file for complete search history.

(56) References Cited

U.S. PATENT DOCUMENTS 1,665,554 A  4/1928 Kolb
2,090,411 A * 8/1937 Eason ..................... F16D 13/30
                                                        192/209
4,238,017 A * 12/1980 Spokas ................. F16D 25/123
                                                        192/82 T

FOREIGN PATENT DOCUMENTS

AT        83829 B       5/1921
DE       268038 A      12/1911
(Continued)

OTHER PUBLICATIONS

Office Action dated May 23, 2020, for corresponding German application No. 10 2019 129 614.5.

*Primary Examiner* — Huan Le
(74) *Attorney, Agent, or Firm* — Nath, Goldberg & Meyer; Jerald L. Meyer; Morgan D. Rosenberg (57) ABSTRACT A coupling arrangement is provided and includes a first component, a second component, a press-on element, and an actuating unit, such that the second component can be displaced from a first position to a second position. The actuating unit includes an actuator and a lever rotatably mounted in the second component about an axis of rotation perpendicular to a longitudinal axis and having a contact surface to contact a fixed mating surface. The contact surface and/or the mating surface has a convex curvature, and the actuator and the lever cooperate such that the movement of the actuator along the longitudinal axis is converted into movement of the lever on the mating surface, (Continued)

and such that the second component is displaced along the longitudinal axis in the second position.

9 Claims, 6 Drawing Sheets

(51) Int. Cl.
*F16D 23/12* (2006.01)
*F16D 25/08* (2006.01)

(56) References Cited

FOREIGN PATENT DOCUMENTS

| | | |
|---|---|---|
| DE | 945201 B | 7/1956 |
| DE | 10214669 A1 | 10/2003 |
| DE | 102005005791 A1 | 8/2006 |
| DE | 102007058513 A1 | 7/2008 |
| DE | 102017208603 A1 | 11/2018 |
| WO | 2008/135036 A1 | 11/2008 |

* cited by examiner

PRIOR ART

PRIOR ART

CONE FRICTION CLUTCH HAVING AN ACTUATOR AND A LEVER FOR DISENGAGING THE CLUTCH

This is a National Phase Application filed under 35 U.S.C. 371 as a national stage of PCT/EP2020/075111, filed Sep. 8, 2020, an application claiming the benefit of German Application No. 10 2019 129 614.5 filed Nov. 4, 2019, the content of each of which is hereby incorporated by reference in its entirety.

The present invention relates to a coupling arrangement.

The present coupling arrangement comprises a first component, which defines a longitudinal axis, and a second component, which is displaceably mounted along the longitudinal axis. The second component is pretensioned in a first position by means of a press-on element, in which first position the second component is in frictional engagement with the first component. Torque can be transmitted from the first component rotating about the longitudinal axis to the second component and vice versa with such coupling arrangements. In the second position, the first component and the second component are arranged at a distance one from the other, such that the frictional engagement is eliminated and no torque can be transmitted. Coupling arrangements of this kind are known, inter alia, from DE 102 14 669 A1, DE 10 2005 005 791 A1, DE 10 2017 208 603 A1, DE 10 2007 058 513 A1, DE 945 201 B, DE 10 2019 101 760 A1 and WO 2008/135036 A1.

In particular, when such a coupling arrangement is used by towing vehicles, for example trucks, the following situation occurs: On the one hand, high torques must be transmitted, and on the other hand, the available installation space, in particular the radial installation space is limited due to design specifications. In order to be able to reliably transmit the available torque, cones that correspond to one another are often used. The smaller the cone angle, which the cones enclose with the longitudinal axis, the higher the torque that can be transmitted. However, as the cone angle decreases, there is also an increase in the opening force required to release the second component from the first component and move it into the second position in order to interrupt the frictional engagement and thus the transmission of torque. The available opening force is likewise limited due to the design specifications, which force is provided by actuators, for example, pneumatic cylinders. In order to be able to release the second component from the first component with the available opening force, gear ratios are used, in particular making use of levers.

Due to the frictional engagement, during the operation of the coupling arrangement, wear of the first component and the second component occurs. Due to the wear, the transmission ratios provided by the lever are altered, such that the following situation can occur: When the first and second components are in as-new condition, where there is no or only negligible wear, the second component can readily be released from the first component with the available opening force; the release of the second component from the first component does become increasingly difficult with increasing wear, until the wear is such that the opening force is no longer sufficient. As a result, the second component can no longer be released from the first component, whereby the coupling can no longer be operated as intended and must be replaced.

The task of one embodiment of the present invention is to provide a coupling arrangement with which it is possible to ensure, given a specific opening force and a given opening space, that it is possible to safely release the second component from the first component even in the event of greater wear of the first component and of the second component.

This task is solved with the features indicated in claim 1. Advantageous embodiments are the subject of the subclaims.

One embodiment of the invention relates to a coupling arrangement comprising
 a first part, which defines a longitudinal axis,
 a second component, which is displaceably mounted along the longitudinal axis,
 a press-on element, which pretensions the second component in a first position, in which the second component is in frictional engagement with the first component, and
 an actuating unit, with which the second component is displaceable from the first position into a second position, in which the second component is distanced from the first component, wherein the actuating unit
  comprises an actuator, which is displaceable along the longitudinal axis and thereby provides an opening force, and
  a lever which is rotatably mounted in the second component about an axis of rotation that is perpendicular to the longitudinal axis, and has a contact surface, with which the lever is in contact with a fixed mating surface, wherein the contact surface and/or the mating surface has a convex curvature, and
  the actuator and the lever cooperate in such a way that the movement of the actuator along the longitudinal axis is converted into a movement of the lever on the mating surface, whereby the second component is displaced along the longitudinal axis in the second position.

In coupling arrangements known from the state of the art, the lever is rotatably fastened to a component that is fixed along the longitudinal axis. On the basis of this arrangement, the transmission ratios that are provided by the lever change as wear increases, such that, as the entity of the wear of the first component and the second component increases, the opening force required to release the first component from the second component increases more and more. If the wear exceeds a certain magnitude, the available opening force is no longer sufficient to release the second component from the first component.

According to the proposal, however, the lever is arranged on the second component so that it can rotate about a rotational axis running perpendicular to the longitudinal axis. The rotational axis of the levers therefore follows the movement of the second component. In this, the lever has a contact surface with which the lever rests against a fixed mating surface. Either the contact surface or the mating surface or both surfaces have a convex curvature. If the actuator is actuated when the second component is located in the first position, it presses on the lever such that the lever rotates about the rotational axis, resulting in the contact surface moving relative to the mating surface. The relative movement between the contact surface and the mating surface is not exclusively a rolling movement, but rather a superposition of a rotational and translational movement. As a consequence, the contact surface slides relative to the mating surface. On the basis of the movement of the lever, the second component is moved into the second position with a certain transmission ratio.

On the basis of the coupling arrangement according to the proposal, given like design, the transmission ratios provided by the lever are significantly less dependent on wear than is the case with coupling arrangements from the state of the art. In this respect, it is possible to release the second component with the available opening force even with increasing wear. As a result, the coupling arrangement according to the proposal can be operated as intended for longer than is the case with coupling arrangements according to the state of the art.

According to a further embodiment, the first component is fixed along the longitudinal axis, wherein the mating surface is formed by the first component or by a third component connected to the first component. In order to transmit a torque, it is not necessary to make both the first component and the second component movable relative to one another along the longitudinal axis. On the contrary, it is sufficient to make one component, here the second component, movable along the longitudinal axis. In this manner, the mating surface can be formed by the first component or by third component connected to the first component, whereby the construction of the coupling arrangement can be simplified.

In further developed embodiment, the lever may be formed as a two-sided lever. The movement of the actuators is converted into an opposite movement of the second component along the longitudinal axis, whereby a very compact design of the coupling arrangement may be achieved.

In a further developed embodiment, the radius (R) of the convex curvature of the contact surface and/or the mating surface may be selected in such a way that the yield point of the materials forming the contact surface and the mating surface is not exceeded during the intended operation of the coupling arrangement. The larger the radius, the closer the contact surface and/or the mating surface approach being in a plane. It is therefore advisable to make either the contact surface or the mating surface flat. If the radius of the convex curvature is maximized, it is possible to minimize the Hertzian stress which acts between the components which form the contact surface and the mating surface, in this case the lever and the first component or the third component connected with the first component. A setting of the lever and of the first component or of the third component connected to the first component can be avoided. Voltage peaks in the respective components are equalized, such that the loads of the respective components may be reduced. In addition, the first component or the third component connected with the first component as well as the lever may be hardened.

In a further embodiment, the first component may have an outer cone and the second component a corresponding inner cone, wherein the second component may be insertable into the first component to form the frictional engagement, such that the inner cone comes into contact with the outer cone.

In the framework of the present application, the term "outer cone" is understood to describe the component into which the component having the "inner cone" is inserted. Accordingly, the cone-shaped surface of the outer cone faces the longitudinal axis, whereas the cone-shaped surface of the inner cone faces away from the longitudinal axis. The frictional engagement between the first component and the second component is made by means of the cone-shaped surfaces, whereby the transmissible torque is significantly increased when compared to flat surfaces.

According to a further embodiment, the outer cone and the inner cone enclose a cone angle with the longitudinal axis, wherein the cone angle falls in a range between 4° and 8°. In this cone angle range, it is possible that particularly high torques can be transmitted, however, at the same time, the opening forces can be limited to a manageable level using the coupling arrangement according to the proposal, including with increasing wear.

A further developed embodiment is characterized in that
  the first component and the second component are rotatably mounted about the longitudinal axis,
  the first component or the second component are rotatably driven by means of a drive unit, and
  the rotational movement of the driven component can be transmitted to the non-driven component when a frictional engagement is created.

In this case, the drive unit can be designed as an electric motor or an internal combustion engine.

According to a further embodiment, the actuator comprises a pneumatic cylinder, a hydraulic cylinder or an electric cylinder. Such actuators are inexpensive to manufacture. Pneumatic and hydraulic systems are, in particular, in use in towing vehicles such as trucks, such that the corresponding energy sources are available in any case. The actuator in one of these embodiments can therefore be easily integrated into existing systems.

A further embodiment is characterized in that the actuator comprises a transmission body cooperating with the lever to transmit the displacement movement provided to the lever by the pneumatic cylinder, by the hydraulic cylinder or by the electric cylinder. The transmission body can be adapted to the existing structural conditions, so that it is not necessary to undertake any adaptation to the actuators themselves. Accordingly, commercially available actuators may be used, whereby costs can be kept low.

In a further embodiment, it is provided that a rolling bearing is arranged between the actuator and the transmission body. In this embodiment, it is not necessary to rotatably mount the actuator, whereby the design cost can be kept low and the operation of the actuator can be simplified.

Exemplary embodiments of the invention are explained in more detail below with reference to the accompanying drawings. Wherein.

Figure 1:
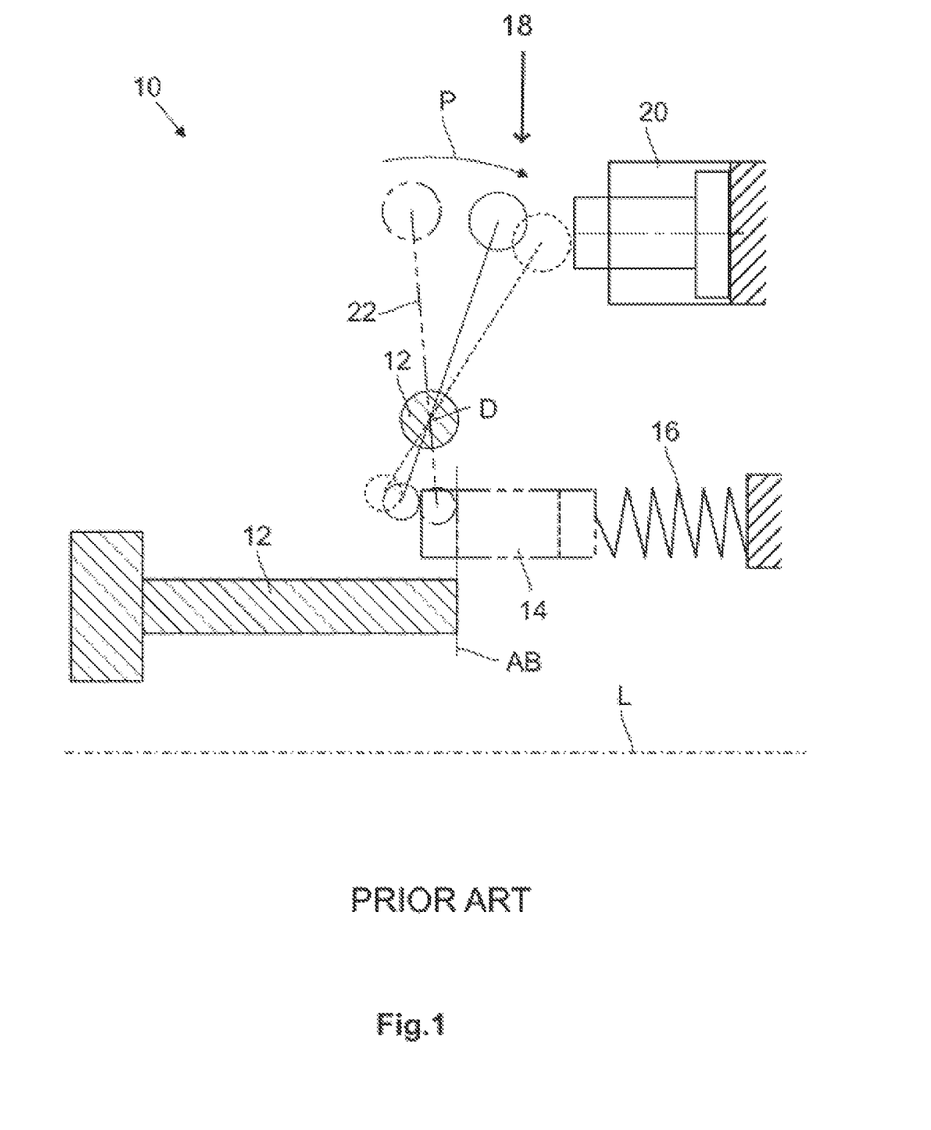
FIG. 1 shows a principal illustration of a coupling arrangement according to the state of the art.

FIG. 1 shows a coupling arrangement 10 according to the state of the art in a highly simplified illustration that is reduced to the essentials. The coupling arrangement 10 comprises a first part 12, which defines a longitudinal axis L. The first component 12 is rotatably mounted about the longitudinal axis L, however, it is fixed along the longitudinal axis L. The coupling arrangement 10 furthermore comprises a second component 14, which is displaceably mounted along the longitudinal axis L and is pretensioned in a first position by means of press-on elements 16, in which position it bears against the first component 12, forming a frictional engagement. For illustration purposes, the first component 12 and the second component 14 are illustrated offset from one another, but in the first position they rest up against each other along a contact surface AB. On the basis of the then existent frictional engagement, a torque can be transmitted between the first component 12 and the second component 14.

The coupling arrangement 10 further comprises an actuating unit 18, with which the second component 14 is displaceable from the first position into a second position. In the second position, which is not shown, the second component 14 is arranged at a distance from the first component 12, such that the frictional engagement is eliminated and no torque is transmissible. The actuating unit 18 comprises an actuator 20, which is displaceable along the longitudinal axis L and which provides an opening force. The actuating unit 18 furthermore has a two-sided lever 22 which is rotatably mounted about a rotational axis D extending perpendicularly to the longitudinal axis L. The rotational axis D is assigned to the first component 12 and as a consequence is not displaceable along the longitudinal axis L.

A first end of the lever 22 is in contact with the actuator 20 and the second end is in contact with the second component 14.

If the actuator 20 is actuated, it moves along the longitudinal axis L. With reference to FIG. 1, the actuator 20 moves towards the left. In so doing, the lever 22 is rotated to the left about the rotational axis D. On the basis of the fact that the lever 22 is designed as a two-sided lever 22, the second component 14 is displaced to the right along the longitudinal axis L into the second position with a corresponding transmission ratio, wherein the second component 14 is distanced from the first component 12 and the press-on element 16 is compressed. As a result, the frictional engagement is eliminated, such that torque can no longer be transmitted.

On the basis of the frictional engagement, wear occurs during operation of the coupling arrangement 10, as a result of which the wall thicknesses of the first component 12 and of the second component 14 decrease. This wear is symbolized in FIG. 1 by the fact that the free end face of the second component 14 migrates from a first position, which position it takes on in the as-new and free-of-wear condition of the coupling arrangement 10, to a second position. Referring to FIG. 1, the first position moves to the left, whereby the rotational position of the lever 22 in the first position changes. Starting from an as-new condition of the coupling arrangement 10, the lever 22 is rotated to the right on the basis of the migration of the first position with the increasing wear, as indicated by the arrow P. This can decrease the transmission ratio provided by the lever 22. Depending on the design of the coupling arrangement 10, the transmission ratios related to a certain degree of wear can be reduced to 80% of the original value without wear. This can lead to the situation where the opening force provided by the actuator 20 in the as-new condition of the coupling arrangement 10 is sufficient to move the second component 14 into the second position. If the wear exceeds a certain degree, the opening force is no longer sufficient due to the reasons mentioned here above, such that the coupling arrangement 10 can no longer be operated as intended.

Figure 2:
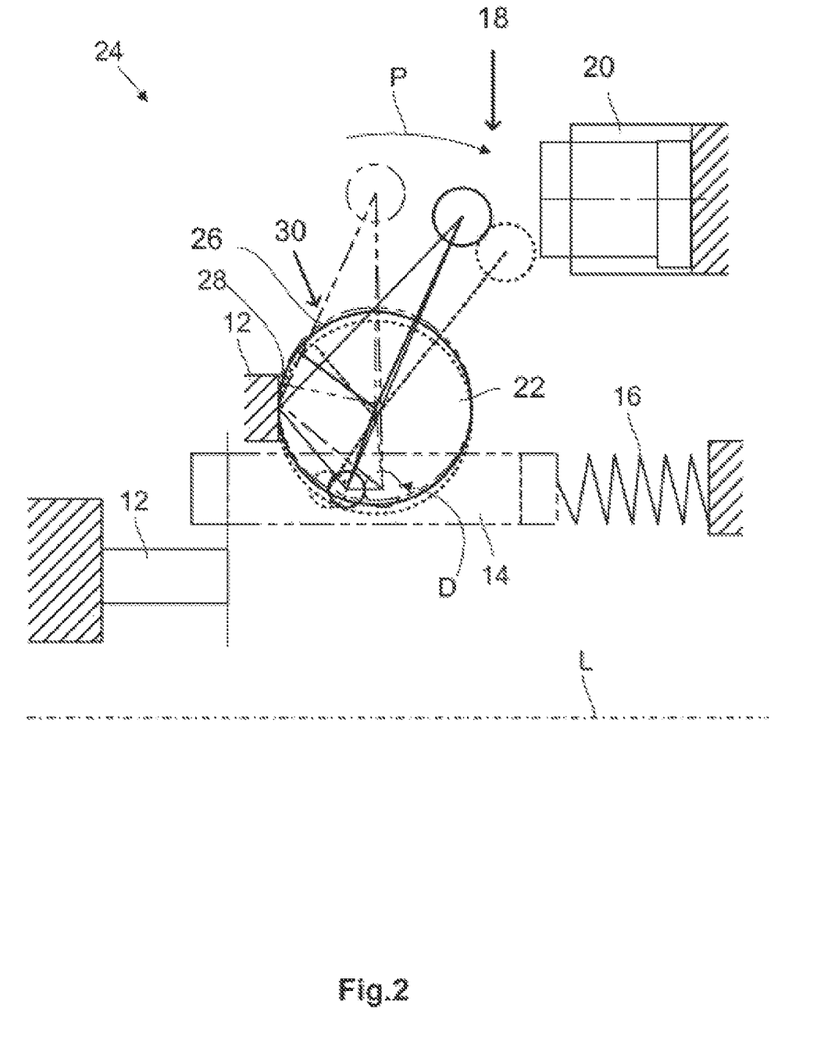
FIG. 2 shows a principal illustration of a coupling arrangement according to the invention.

FIG. 2 shows a coupling arrangement 24 according to the proposal, likewise in a highly simplified illustration that is reduced to the essentials. The essential difference is that the lever 22 is mounted, on one side, in the second component 14, about a rotational axis D extending perpendicular to the longitudinal axis L and on the other side has a contact surface 26 with a convex curvature 30, with which the lever 22 rests against a fixed flat mating surface 28. The fixed flat mating surface 28 is formed from the first component 12 or with a second component 14 connected to the first component 12. Whereas the mating surface 28 is fixed, the rotational axis D is displaceable with the second component 14 along the longitudinal axis L. In other aspects, the coupling arrangement 24 is to be substantially constructed as assumed in FIG. 1. In particular, the installation space and the available opening force are to be the same.

While it is true that here too, relative to the first position, the lever 22 is rotated to the right with increasing wear, the transmission ratios do however remain largely unaffected. As mentioned, the value of the transmission ratio of the lever 22 drops to 80% of the original transmission ratio upon reaching a certain degree of wear in the coupling arrangement 24 known from the state of the art. In contrast, due to the proposed lever arrangement, with the same degree of wear and while otherwise retaining the same design of the coupling arrangement 24, the transmission ratio only drops to 95% of the original ratio.

Figure 3A:
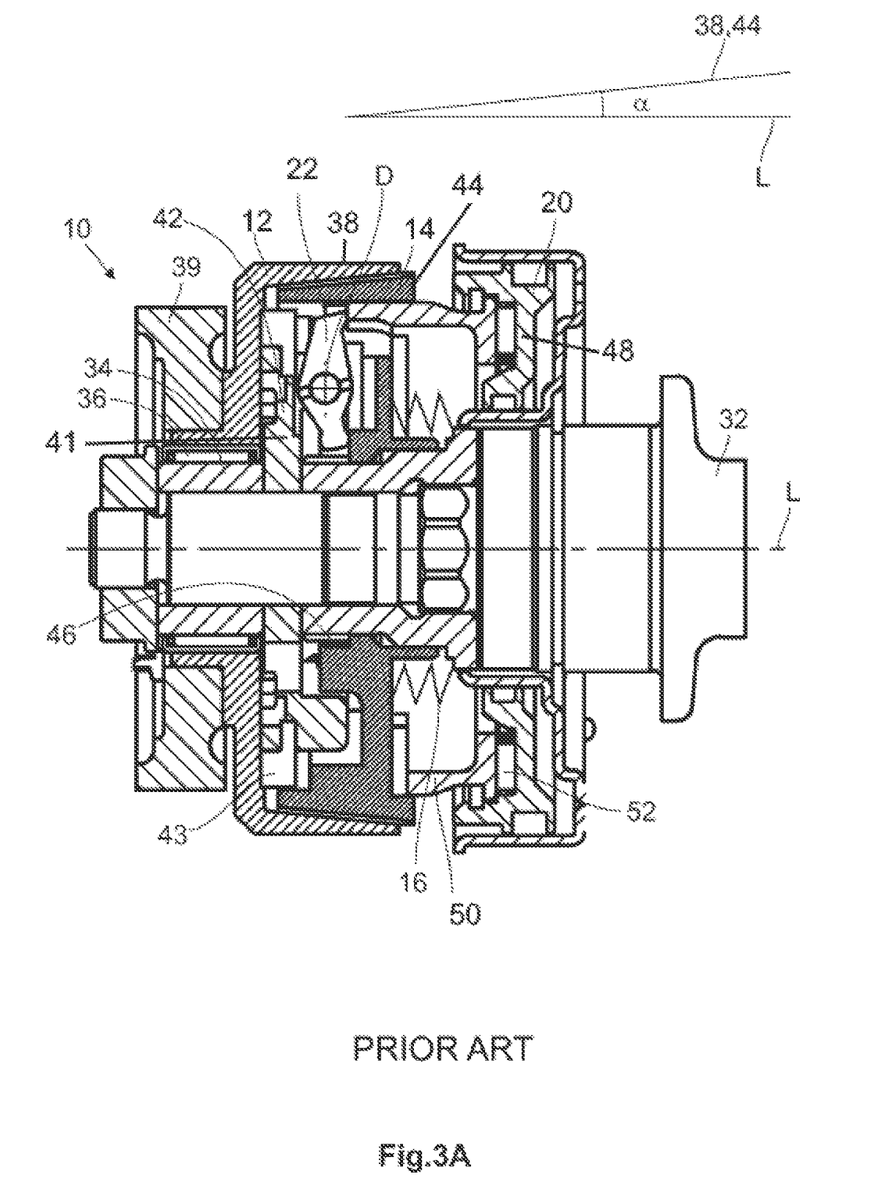
FIG. 3A shows a cross-sectional illustration through a coupling arrangement based upon a coupling arrangement according to the state of the art, as illustrated in FIG. 1, FIG. 3B to FIG. 3E in each case show sectional illustrations of the coupling arrangement shown in FIG. 3A in various operating states.

FIG. 3A shows an embodiment example of a coupling arrangement 10 according to the state of the art in a cross-sectional view. A sleeve 34, which is connected to the shaft 32 in a rotationally fixed manner, is slid onto a shaft 32 which is rotatable about the longitudinal axis L. A radial bearing 36 is arranged on the sleeve 34. The radial bearing 36 serves for the rotatable mounting of the already mentioned first component 12, which, in the example shown, comprises an outer cone 38. The first component 12 is connected in a rotationally fixed manner with a gear 39, which can interact in a further not illustrated manner with a drive unit 40, in particular with an electric motor or an internal combustion engine, whereby the rotational movement that is provided by the drive unit 40 can be transmitted to the first component 12 (see FIG. 4A). The radial bearing 36 is designed so that it cannot absorb any axial forces. A slip ring 43 serves to absorb axial forces. Furthermore, the coupling arrangement 10 comprises a third component 41, in the case in point a flange 42. The flange 42 and the first component 12 are not movable with respect to the longitudinal axis L.

Furthermore, the coupling arrangement 10 comprises the likewise mentioned second component 14, which comprises an inner cone 44, which corresponds to the outer cone 38 of the first component 12. It should here be noted that the terms "outer cone 38" and "inner cone 44" should be understood to mean that the outer cone 38 is radially arranged outside the inner cone 44. As a result, the cone-shaped surface of the outer cone 38 points toward the longitudinal axis L, whereas the cone-shaped surface of the inner cone 44 points away from the longitudinal axis L. Both the outer cone 38 as well as also the inner cone 44 enclose cone angle α with the longitudinal axis L, which, in the illustrated embodiment example, is between 5° and 6°.

The second component 14 is non-rotatably connected to the sleeve 34 by means of gear teeth 46 and consequently also non-rotatably connected with the shaft 32, wherein the second component 14 is displaceable along the longitudinal axis L relative to the sleeve 34. The coupling arrangement 10 furthermore comprises the already described press-on element 16, which is supported on the sleeve 34 and pretensions the second component 14 in the position, in which the second component 14 frictionally engages the first component 12. The second component 14 is in the first position in FIG. 3A. On the basis of the frictional engagement, the rotational movement, which is transmitted by means of the gear 39 to the first component 12, can be transmitted onwards to the second component 14. On the basis of the rotationally fixed connection of the second component 14 to the sleeve 34, the rotational movement is transmitted to the shaft 32, with which the rotational movement can, for example, be transmitted to a drive train, which is not shown here, with which a consumer is driven.

Furthermore, the coupling arrangement 10 comprises the likewise mentioned actuating unit 18, which has the two-sided lever 22, which is mounted in the coupling arrangement 10 so as to be rotatable about the axis of rotation D extending perpendicular to the longitudinal axis L. In this case, the lever 22 is at least indirectly connected to the first component 12, such that the rotational axis D is likewise not displaceable along the longitudinal axis L. The actuating unit 18 furthermore comprises the actuator 20, which in the illustrated embodiment example is configured as a pneumatic cylinder 48. The pneumatic cylinder 48 can be exposed to compressed air, whereby it is moved along the longitudinal axis L and thereby provides an opening force. In addition, the actuating unit 18 comprises a transmission body 50 with which the movement of the pneumatic cylinder 48 can be transmitted to the lever 22. For this purpose, the transmission body 50 adjoins the lever 22 at a distance from the rotational axis D. In addition, the lever 22 adjoins the second component 14 on the opposite side of the rotational axis D, at a distance from it.

The pneumatic cylinder 48 is mounted in a rotationally fixed manner, whereas the transmission body 50 together with the second component 14 can rotate about the longitudinal axis L. In order to be able to allow the relative movements between the transmission body 50 and the pneumatic cylinder 48, a rolling bearing 52 is arranged between the pneumatic cylinder 48 and the transmission body 50.

Figure 3B:
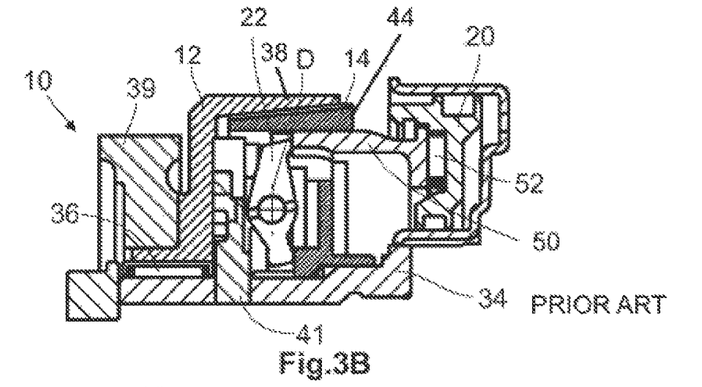

FIG. 3B newly illustrates the coupling arrangement 10 illustrated in FIG. 3A, wherein, in FIG. 3B, the parts not needed for explanation of the present invention have been omitted. As in FIG. 3A, the second component 14 is likewise located in the first position in FIG. 3B, in which position the second component 14 is frictionally engaged with the first component 12 due to the pretensioning of the press-on element 16. As a consequence, a torque can be transmitted. The coupling arrangement 10 is in the coupled state.

Figure 3C:
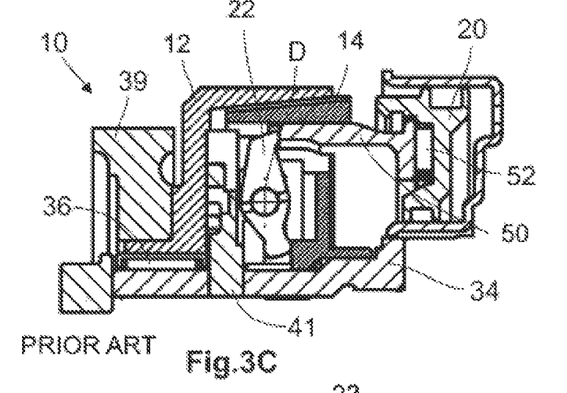

In order to be able to interrupt the transmission of the torque, the pneumatic cylinder 48 is exposed to compressed air, whereby it moves to the left in relation to the illustration selected in FIG. 3B (see FIG. 3C). In so doing, the pneumatic cylinder 48 provides the specified opening force. The transmission body 50 transmits this movement to the lever 22, which consequently rotates to the left about the rotational axis D. This rotational movement is transmitted by the lever 22 with a certain transmission ratio to the second component 14, which as a result is moved to the right into the second position, in which the second component 14 is arranged at a distance from the first component 12, whereby the frictional engagement is eliminated and the transmission of torque is interrupted. The coupling arrangement 10 is in the open state.

The coupling arrangement 10 is in the as-new condition in both FIG. 3B as well as also FIG. 3C. In the as-new condition of the coupling arrangement 10, neither the first component 12 nor the second component 14 show any wear. FIG. 3E shows the coupling arrangement 10 in coupled state, however the coupling arrangement 10 is no longer as-new, so that both the first component 12 as well as also the second component 14 show a certain degree of wear. Comparing the rotational position of the lever 22 in FIG. 3B with the illustration of the lever 22 in FIG. 3E, it can be seen that the lever 22 has been rotated towards the right about the rotational axis D due to wear. Starting from the state illustrated in FIG. 3E, further wear leads to further rotation to the right about the rotational axis D of the lever 22. Upon reaching a certain degree of wear, the lower end of the lever 22 strikes the flange 42. As a result, the lever 22 can no longer be rotated in a clockwise direction, which means that the second component 14, can no longer be moved further to the left due the press-on element 16. As a result, the coupling arrangement 10 can no longer be transferred to the coupled state and can no longer be operated as intended.

Figure 3D:
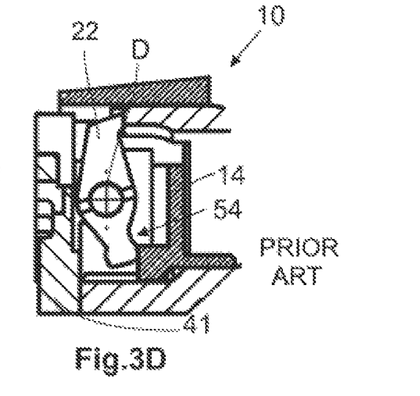
Figure 3E:
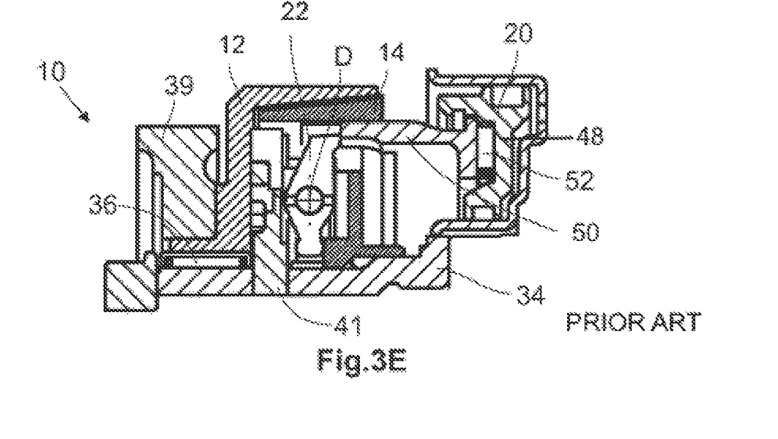

In order to increase the degree of wear which elicits contact between the lever 22 and the flange 42, the lever 22 is provided with a concave curvature 54 in the region in which it rests against the second component 14, which is, in particular, readily recognizable from FIG. 3D, which is reproduced in an enlarged version in FIG. 3C. Due to the concave curvature 54, the lever 22 becomes slimmer at this end, which is why it only comes into contact with the flange 42 at a higher degree of wear, whereby the coupling arrangement 10 can be operated for a longer period of time as intended. However, the concave curvature 54 also means that due to the lesser material thickness there, the strength of the lever 22 in the area of this end is reduced and the lever 22 can fail even with a lighter load. The tendency to fail is further increased by the concave curvature 30, since this causes a notch effect.

At this point, reference should again be made to the reduction in the transmission ratios provided by the lever 22 described with reference to FIG. 1 and brought about by wear.

Figure 4A:
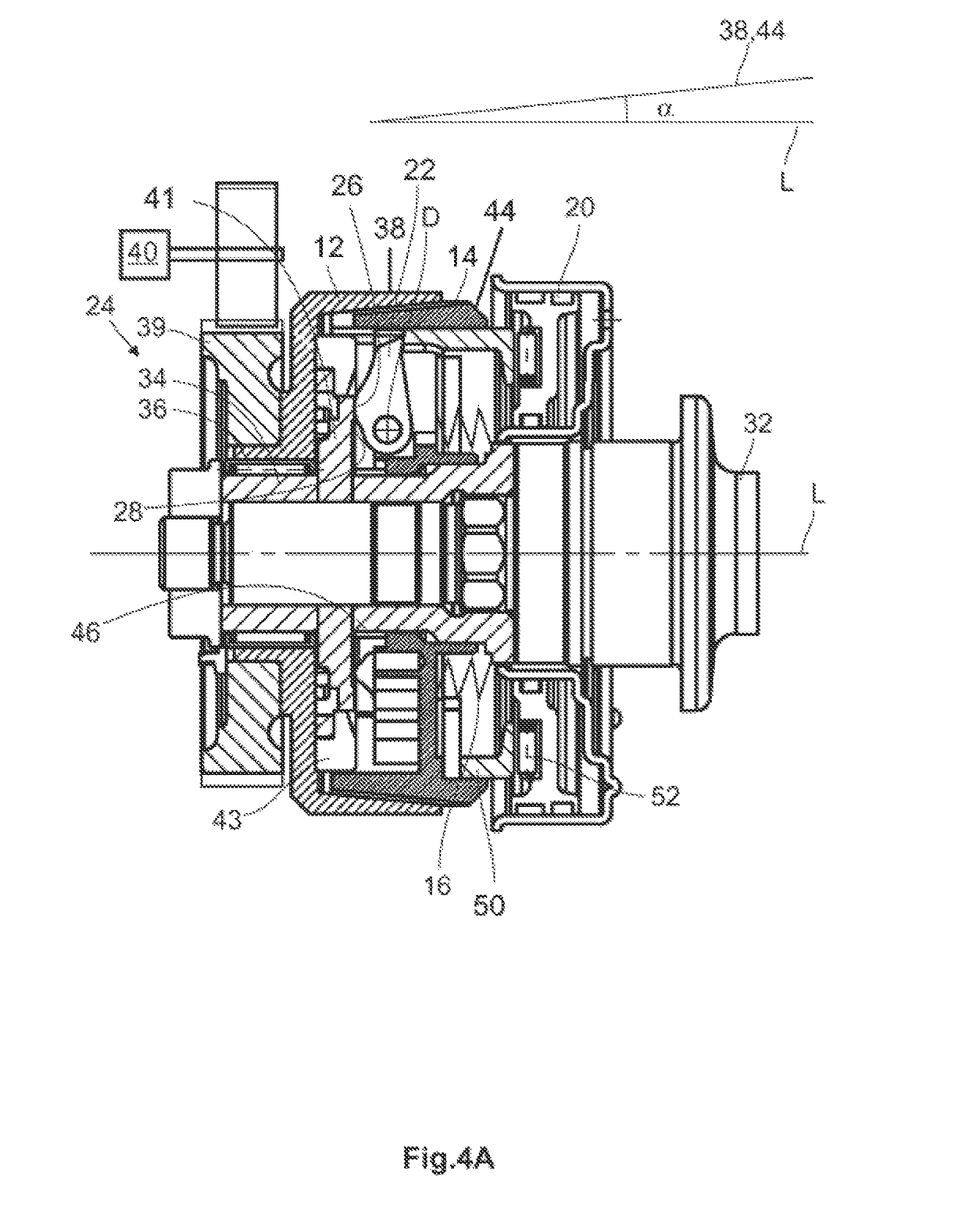
FIG. 4A shows a cross-sectional illustration through a coupling arrangement based upon a coupling arrangement according to the invention, as illustrated in FIG. 2, and FIG. 4B to FIG. 4D in each case show sectional illustrations of the coupling arrangement shown in FIG. 4A in various operating states.

FIG. 4A shows a coupling arrangement 24 according to the invention by means of a cross-sectional view. As mentioned here above, the coupling arrangement 24 according to the invention differs from that according to the state of the start in that the rotational axis D of the levers 22 is arranged in the second component 14 such that the lever 22 can follow the movement of the second component 14. Moreover, the lever 22 rests with the contact surface 26, which has the convex curvature 30, against the mating surface 28 formed by the flange 42, which is not movable with respect to the longitudinal axis L.

The manner of actuation of the coupling arrangement 24 substantially corresponds to that described for the coupling arrangement 24 according to the state of the art shown in FIGS. 3A to 3E. In particular, the available installation space, the available opening force provided by the pneumatic cylinder 48, and the cone angle α should be the same.

Figure 4B:
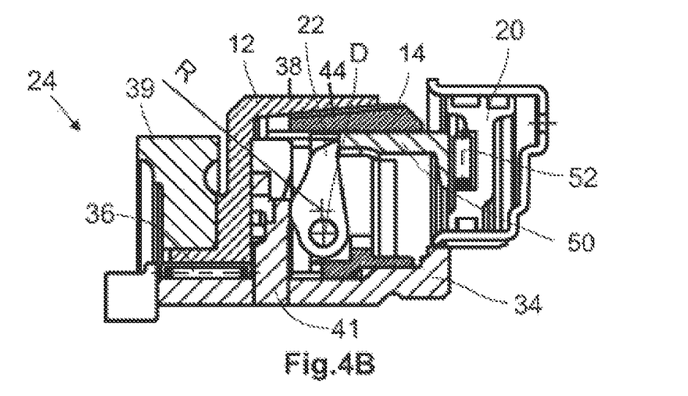
Figure 4C:
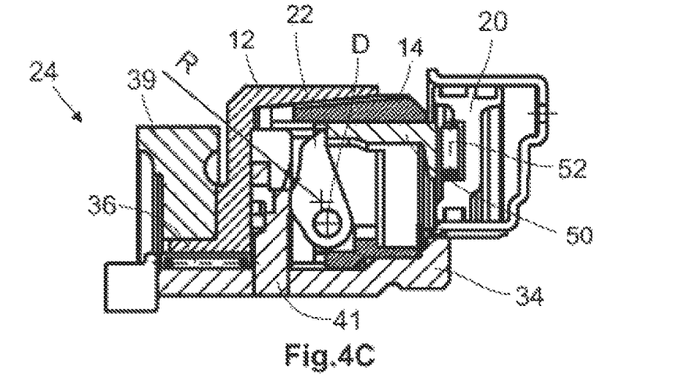
Figure 4D:
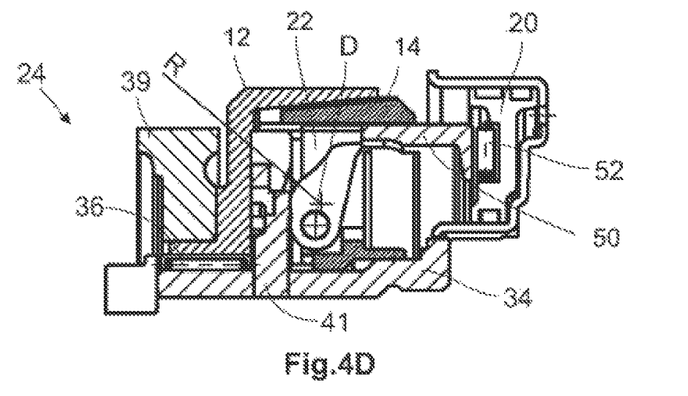

The coupling arrangement 24 illustrated in FIG. 4A is shown in different states in the FIGS. 4B to 4D, wherein the components not relevant to the explanation of the present invention are omitted. In FIG. 4B, as in FIG. 4A, the coupling arrangement 24 is in coupled state, wherein the coupling arrangement 24 is as-new and therefore the first component 12 and the second component 14 do not show any wear. In FIG. 4C, the as-new coupling arrangement 24 is found to be opened state, in which the second component 14 is arranged distanced from the first component 12 and the frictional engagement is eliminated. It becomes clear when comparing FIG. 4B and FIG. 4C, that the pneumatic cylinder 48 has been moved towards the left to open the coupling arrangement 24, wherein the lever 22 has been rotated towards the left about the rotational axis D. In this case, the lever 22 performs a sliding movement on the contact surface 26 with respect to the mating contact surface 28, which leads to the axis of rotation D of the lever 22 to be shifted to the right. This shift of the rotational axis D towards the right likewise brings about a movement of the second component 14 along the longitudinal axis L towards the right, whereby the second component 14 moves in the second position and the frictional engagement and the transmission of torque are eliminated.

The coupling arrangement 24 in the coupled state is illustrated in FIG. 4D, wherein the first component 12 and the second component 14, however, show a certain degree of wear. Comparing FIG. 4B and FIG. 4D with one another, it can be seen that as the degree of wear increases, the lever 22 in the first position is rotated to the right about the rotational axis D. In contrast to the mounting of the lever 22 from the state of the art and illustrated in the FIGS. 3A to 3E, the lever 22 interacts with the second component 14 by means of the rotational axis D and does not bear against the second component 14. As mentioned, in the embodiment of the coupling arrangement 24 according to the invention, the lever 22 carries out a sliding movement with respect to the flange 42, for which purpose the lever 22 has the already mentioned convex curvature 30. The danger of blocking of the lever 22, as has been described for the solution known from the state of the art, does not exist here. In addition, it is not necessary to increase the degree of wear at which the lever 22 blocks by means of a slim implementation of the lever 22. The tendency to fail described here above of the lever 22 does not exist in the case of the embodiment according to the invention.

The Hertzian stress, which is present between the flange 42 and the lever 22 in the region of the contact surface 26 and the mating surface 28, can be reduced with an increase of the radius R of the convex curvature 30. As a result, the load on the lever 22 is kept low.

In addition, at this point it should be noted that the reduction in the transmission ratio provided by the lever 22, which is established as a result of the increasing degree of wear, is significantly lower in the design of the coupling arrangement 24 according to the invention compared to the coupling arrangement 24 according to the state of the art. In this respect, the risk that the coupling arrangement 24 can no longer be opened after a certain degree of wear is reached with a given opening force, which is provided by the pneumatic cylinder 48, and with a given installation space, it can be significantly reduced. It is therefore possible to operate the coupling arrangement 24 with a high level of operational reliability, even at a comparatively low cone angle α over a longer period of time than is the case with coupling arrangements 10 known from the state of the art.

REFERENCE LIST

10 Coupling arrangement according to the state of the art
12 First component
14 Second component
16 Press-on element
18 Actuating unit
20 Actuator
22 Lever
24 Coupling arrangement
26 Contact surface
28 Mating surface
30 Convex curvature
32 Shaft
34 Sleeve
36 Radial bearing
38 Outer cone
39 Gear
40 Drive unit
41 Third component
42 Flange
43 Slip ring
44 Inner cone
46 Gear teeth
48 Pneumatic cylinder
50 Transmission body
52 Rolling bearing
54 Concave curvature
AB Contact surface
D Rotational axis
L Longitudinal axis
P Arrow
R Radius
α Cone angle

The invention claimed is:

1. A coupling arrangement (24) comprising:
a first component (12), which defines a longitudinal axis (L);
a second component (14), which is displaceably mounted along the longitudinal axis (L);
a press-on element (16), which pretensions the second component (14) in a first position, in which the second component (14) is in frictional engagement with the first component (12); and
an actuating unit (18), with which the second component (14) can be displaced from the first position to a second position, in which the second component (14) is distanced from the first component (12), wherein the actuating unit (18)
an actuator (20), which is displaceable along the longitudinal axis (L) and thereby provides an opening force; and
a lever (22) which is rotatably mounted in the second component (14) about an axis of rotation (D) that is perpendicular to the longitudinal axis (L), and has a contact surface (26), with which the lever (22) is in contact with a fixed mating surface (28), wherein the contact surface (26) and/or the mating surface (28) has a convex curvature (30),
wherein the actuator (20) and the lever (22) cooperate in such a way that the movement of the actuator (20) along the longitudinal axis (L) is converted into a movement of the lever (22) on the mating surface (28), whereby the second component (14) is displaced along the longitudinal axis (L) in the second position, and
wherein the lever (22) is a two-sided lever.

2. The coupling Coupling arrangement (24) according to claim 1, characterized in that the first component (12) is fixed along the longitudinal axis (L) and that the mating surface is formed by a third component (41) which is connected with the first component (12).

3. The coupling arrangement (24) according to claim 1, characterized in that a radius (R) of the convex curvature (30) is selected in such a way that a yield point of materials forming the contact surface (26) and the mating surface (28) is not exceeded during an intended operation of the coupling arrangement.

4. The coupling arrangement (24) according to claim 1, characterized in that the first component (12) has an outer cone (38) and the second component (14) has a corresponding inner cone (44), wherein the second component (14) is insertable into the first component (12) to form the frictional engagement such that the inner cone (44) engages with the outer cone (38).

5. The coupling arrangement (24) according to claim 1, characterized in that outer cone (38) and the inner cone (44) enclose a cone angle (α) with the longitudinal axis (L), wherein the cone angle (α) falls in a range between 4° and 8°.

6. The coupling arrangement according to claim 1, characterized in that
the first component (12) and the second component (14) are rotationally mounted about the longitudinal axis (L),
the first component (12) is rotatably driven by means of a drive unit (40), and
the rotational movement of the first component (12) is transmittable to the second component (14) when there is a frictional engagement therebetween.

7. The coupling arrangement (24) according to claim 1, characterized in that the actuator (20) comprises a pneumatic cylinder (48), a hydraulic cylinder or an electric cylinder.

8. The coupling arrangement (4) according to claim 7, characterized in that the actuator (20) comprises a transmission body (50) cooperating with the lever (22) for transmission of displacement movement provided to the lever (22) by the pneumatic cylinder, by the hydraulic cylinder or by the electric cylinder.

9. The coupling arrangement (24) according to claim 7, characterized in that a roller bearing (52) is arranged between the actuator (20) and the transmission body (50).

* * * * *

UNITED STATES PATENT AND TRADEMARK OFFICE
CERTIFICATE OF CORRECTION

PATENT NO. : 11,739,799 B2
APPLICATION NO. : 17/774062
DATED : August 29, 2023
INVENTOR(S) : Björn Bergfeld It is certified that error appears in the above-identified patent and that said Letters Patent is hereby corrected as shown below:

In the Claims

Claim 2, Column 10, Line 50, please delete the repeated word "Coupling".

Signed and Sealed this
Tenth Day of October, 2023

Katherine Kelly Vidal
*Director of the United States Patent and Trademark Office*